United States Patent [19]
Fuerschbach et al.

[11] Patent Number: 4,992,643
[45] Date of Patent: Feb. 12, 1991

[54] METHOD AND DEVICE FOR CONTROLLING PLUME DURING LASER WELDING

[75] Inventors: Phillip W. Fuerschbach, Tijeras; James L. Jellison, Albuquerque; David M. Keicher, Albuquerque; William L. Oberkampf, Albuquerque, all of N. Mex.

[73] Assignee: United States Department of Energy, Washington, D.C.

[21] Appl. No.: 398,577

[22] Filed: Aug. 25, 1989

[51] Int. Cl.$^5$ ............................................. B23K 26/00
[52] U.S. Cl. .......................... 219/121.63; 219/121.84
[58] Field of Search ...................... 219/121.84, 121.63, 219/121.64, 121.67, 121.72

[56] References Cited

U.S. PATENT DOCUMENTS

| | | | |
|---|---|---|---|
| 2,041,018 | 5/1936 | Persons | 219/26 |
| 2,184,980 | 12/1939 | Smith | 219/26 |
| 3,707,616 | 12/1972 | Lindkvist | 219/136 |
| 3,798,409 | 3/1974 | Troyer et al. | 219/130 |
| 3,866,398 | 2/1975 | Vernon, Jr. et al. | 219/121.69 X |
| 3,886,344 | 5/1975 | Frantzreb, Sr. et al. | 219/130 |
| 3,909,586 | 9/1975 | Landis et al. | 219/130 |
| 4,127,761 | 11/1978 | Pauley et al. | 219/121 |
| 4,358,662 | 11/1982 | Cranor et al. | 219/230 |
| 4,382,170 | 5/1983 | Klingel | 219/121 |
| 4,720,621 | 1/1988 | Langen | 219/121.69 X |

OTHER PUBLICATIONS

W. Estill et al., "Porosity Decrease In Laser Welds Of Stain-Less Steel Using Plasma Control", SAND-83-8024, Nov. 1983.
C. Banas "Laser Welding Developments", Pater 41 from Conference entitled Related To Power Plants, Proc. C.E.G.B., International Conf. Welding Res., Southampton, England, Sep. 17, 1972.
E. Locke et al., "Deep Penetration Welding With High--Power CO2 Lasers", IEEE Journal of Quantum Electronics, vol. QE-8, No. 2, Feb. 1972, pp. 132-135.
J. Russell, "The Development of Laser As A Welding and Cutting Tool", Weld. Inst. Res. Bull., vol. 16, No. 12, 1975, pp. 345-350.
R. Crafer, "Welding With The 2 kW CO Laser", Weld. Inst. Res. Bull., vol. 17, No. 2, 1976, pp. 29-33.
R. Crafter, "Laser Development Boosts Welding Performance", Weld. Inst. Rest. Bull., vol. 17, No. 4, 1976, pp. 95-98.
M. Watson et al., "An Assessment of the Advantages of Plasma Control in Laser Welding of Austenitic Stainless Steel", The Welding Institute Research Report, Jan. 1983, Abington Hall, Abington, Cambridge.

Primary Examiner—C. L. Albritton
Attorney, Agent, or Firm—Anne D. Daniel; James H. Chafin; William R. Moser

[57] ABSTRACT

A method and apparatus for enhancing the weldment of a laser welding system is provided. The laser weld plume control device includes a cylindrical body defining an upside-down cone cavity; the upper surface of the body circumscribes the base of the cone cavity, and the vertex of the cone cavity forms an orifice concentrically located with respect to the laser beam and the plume which forms as a result of the welding operation. According to the method of the invention, gas is directed radially inward through inlets in the upper surface of the body into and through channels in the wall of the body and finally through the orifice of the body, and downward onto the surface of the weldment. The gas flow is then converted by the orifice of the device from radial flow to an axisymmetric gas jet flowing away from the weldment surface in a direction perpendicular to the surface and opposite to that of the laser.

10 Claims, 5 Drawing Sheets

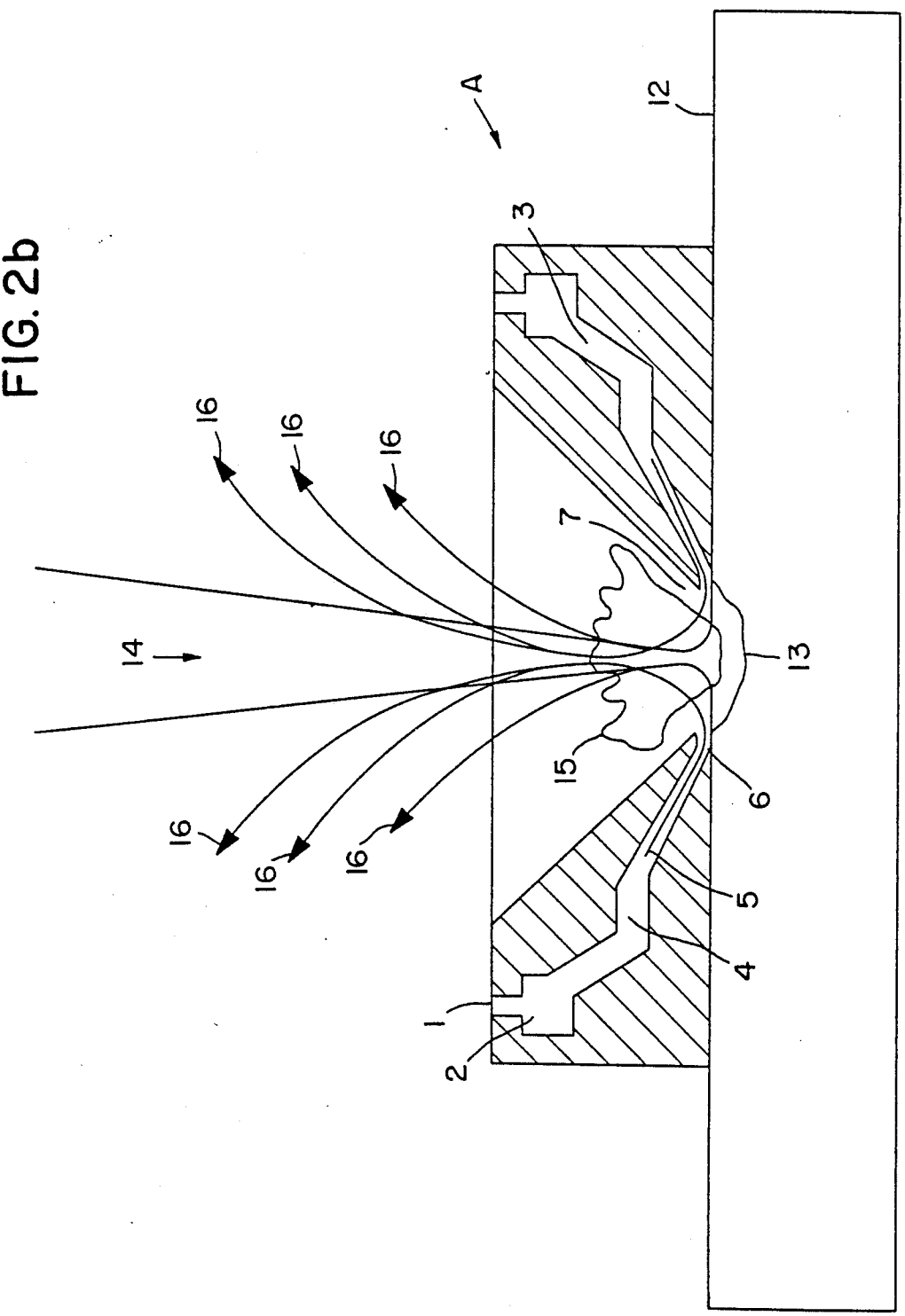

METHOD AND DEVICE FOR CONTROLLING PLUME DURING LASER WELDING

The present invention relates to a method and apparatus for enhancing the weldment of a laser welding system and more specifically to a method and device for controlling the plume resulting from the laser welding process and reducing plume deposits during laser welding. The Government has rights to this invention pursuant to Contract No. DE-AC04-76DP00789 between the U.S. Department of Energy and AT&T Technologies, Inc.

BACKGROUND OF THE INVENTION

During laser-beam welding, significant evaporation of metallic components occurs at the laser beam flux used during welding. When these vapors condense and solidify forming very small particles, some of these particles can be expected to settle on the welded part. The plume which develops and the resulting plume deposits are undesirable with respect to performance considerations, particulate contamination, and for cosmetic reasons. The presence of particulate contamination in electronic assemblies is a very serious problem. In addition, the resulting plume created can interact with the laser beam so as to alter the coupling of the laser beam energy to the metal. If the plume can be eliminated or altered by a gas flow, then control of the thermal characteristics of the process can be improved.

It has been demonstrated that the laser plume and accompanying weld geometry can be altered by impinging a transverse flow of gas near the base of the laser plume. Use of the transverse flow of gas during laser welding has been observed to reduce weld porosity. Such approaches in an attempt to control the laser plume do not eliminate the plume but merely divert the plume to one side and thus change the plume geometry. While affecting the laser weld geometry, use of the transverse flow of gas generally results in an undesirable deposit of condensed particles at the downstream side of the weld.

SUMMARY OF THE INVENTION

Therefore, it is an object of the present invention to provide a method and apparatus for controlling the plume formed during laser welding which will overcome the above-noted disadvantages.

It is a further object of the present invention to provide a method and apparatus for eliminating particulate contamination of the weld area during laser welding.

Another object of the present invention is to provide a method and apparatus which significantly alters or eliminates the laser plume formed during a laser welding operation.

A further object of the present invention is to provide a method and apparatus for independently controlling the metal vapor plume generated during laser welding.

Yet another object of the present invention is to provide a method and apparatus for independently controlling the melting and solidification process which occurs during laser welding.

Still another object of the present invention is to provide a method and apparatus which allows for the collection of diagnostic data that furthers the mathematical modeling of a laser welding process.

Yet a further object of the present invention is to provide a method and an apparatus for controlling the weld geometry of a laser welding operation.

The foregoing objects and others are accomplished in accordance with the present invention by providing a method and apparatus utilized during a laser welding operation whereby a gas flow is directed radially inward on the surface of the weldment, at the base of the plume of products formed during welding. The gas which is directed radially inward on the surface of the weldment is converted to an axisymmetric gas jet moving away from the weldment carrying with it metal vapor, condensate and solidified particles, all of which result from the impinging laser beam.

By regulating the velocity of the gas flow within the gas jet, this vapor can be controlled in such a manner so as to prevent formation of a dense plume which will otherwise interact with the laser beam. Thus, the radially injected gas which is converted to an axisymmetric jet flow moving away from the weldment can fundamentally alter the metal vapor plume. The system of the present invention modifies the formation of a large and diffuse plume which normally would form above the weldment.

In order to create the effect desired and convert the radially directed gas to the axisymmetric gas jet which carries the metal vapor condensate and solidified particles away from the weldment, a laser plume control device is provided having a cylindrical configuration provided with a gas inlet location or locations (at least one, but typically four) equally placed on the upper peripheral surface of the device. Each of the gas inlets empties into a plenum, referred to as the first plenum. The total cross sectional area of gas inlets (total flow area) is substantially smaller than the flow area of the first plenum, typically five times smaller.

The first plenum serves as a stilling chamber in which the gas flow velocity is small compared to the inlet flow velocity and inlet flow turbulence is reduced. The first plenum is connected to a channel or channels (or slots) equally spaced circumferentially around and on the inside wall of the first plenum. Each channel directs the gas from the first plenum to the second plenum which is a continuous channel circumferentially around the device.

The second plenum serves as an additional stilling chamber to reduce flow turbulence of the gas and also to uniformly distribute the inlet gas circumferentially around the device. The flow area in the second stilling chamber (the height of the chamber multiplied by the circumference of the chamber) is roughly equal to the flow area in the first stilling chamber, but typically five times larger than the total inlet flow area to the device. Emanating from the second plenum is an outlet nozzle that directs the flow radially inward.

The outlet nozzle connects circumferentially around the inner wall of the second plenum. The outlet nozzle is designed so that gas flow from the plenum continually accelerates in the radial direction to the exit of the nozzle near the center of the device. The continual acceleration of the gas flow is generated by the fact that the flow is directed radially inward, thereby decreasing the flow area, and by decreasing the height of the nozzle flow area as it progresses radially inward. The nozzle outlet flow area near the center of the device is much smaller (roughly 20–50 times smaller) than each of the plenum flow areas. The combination of the two plenums and the large radial acceleration of the gas flow in the outlet nozzle completely eliminates any inlet flow turbulence and generates a laminar flow. The nozzle configuration generates radially directed, laminar flow that is axisymmetric with respect to the weld pool.

The outlet nozzle terminates at a circular orifice that is concentric with the center of the device. When the plume control device is placed above the weldment the orifice is concentric with the laser beam and the resulting plume. The orifice changes the flow direction out of the nozzle from radial flow to axial flow and generates an axisymmetric jet in a direction opposite to that of the laser beam.

The orifice area is substantially equal to the nozzle exit area so that the gas velocity is maintained similar in magnitude. The nozzle exit area is the circumference of the orifice multiplied by the gap height between the top surface of the nozzle exit and the weldment. The circular orifice area is greater than the circular area of the laser beam, i.e. roughly two to four times the area of the laser beam. This is necessary so that the gas jet flow area, reduced by the "vena contracta effect", is maintained greater than the laser beam area and the flow area generated in the plume. The "vena contracta effect" is the well known fluid dynamics phenomenon of the natural constriction of the flow area as a jet issues out of a sharp-edged orifice.

The orifice of the laser plume control device is centrally located at the base or lower surface of the control device as the pinnacle of an upside-down cone formed in the central portion of the laser plume control device. The upper periphery surface of the control device forms a peripheral base circumscribing the base of the cone, the gas inlets being located in this upper surface. As a result of the device of the present invention, it has been determined that the injected gas issuing from the orifice of the device fundamentally alters the metal vapor plume formed during laser welding.

By providing the laser plume control device, as described, the desired gas flow can be regulated so as to control the laser plume resulting from laser welding such that the weld geometry and various weld characteristics, such as porosity, solidification directions, and solidification rates can be controlled. The device of the present invention is designed such that, as the gas moves over the weld pool, it significantly changes the convective heat transfer rate of the weld pool as it is forming and as it is solidifying. This, in turn, changes the rate of metal vapor formation and the conduction and radiation heat transfer from the weld pool.

Convective heat transfer within the weld pool is very important to laser welding and is largely driven by surface tension gradients that, in turn, are due to temperature gradients at the surface of the site of welding. Use of the plume control device of the present invention minimizes the effect of the plume on the surface temperature gradients. Temperature gradients within the plume can cause the plume to become a thermal lens that can defocus the laser beam. Elimination of the plume enables control of the laser spot size and power density by optical means. Because the plume is typically unsteady, the surface temperature gradients generally would be constantly changing.

Use of the plume control device herein makes the overall laser welding process more stable and thus more predictable.

BRIEF DESCRIPTION OF THE DRAWINGS

The present invention will become more fully understood from the following detailed description and the accompanying Figures which are provided by way of illustration only, and are not intended to be limitative of the present invention, and wherein:

FIG. 2B is a diagrammatic sectional view of the laser plume control device of FIG. 1 which, in operation, results in a decreased laser plume, also shown;

DETAILED DESCRIPTION OF THE INVENTION

Figure 1:
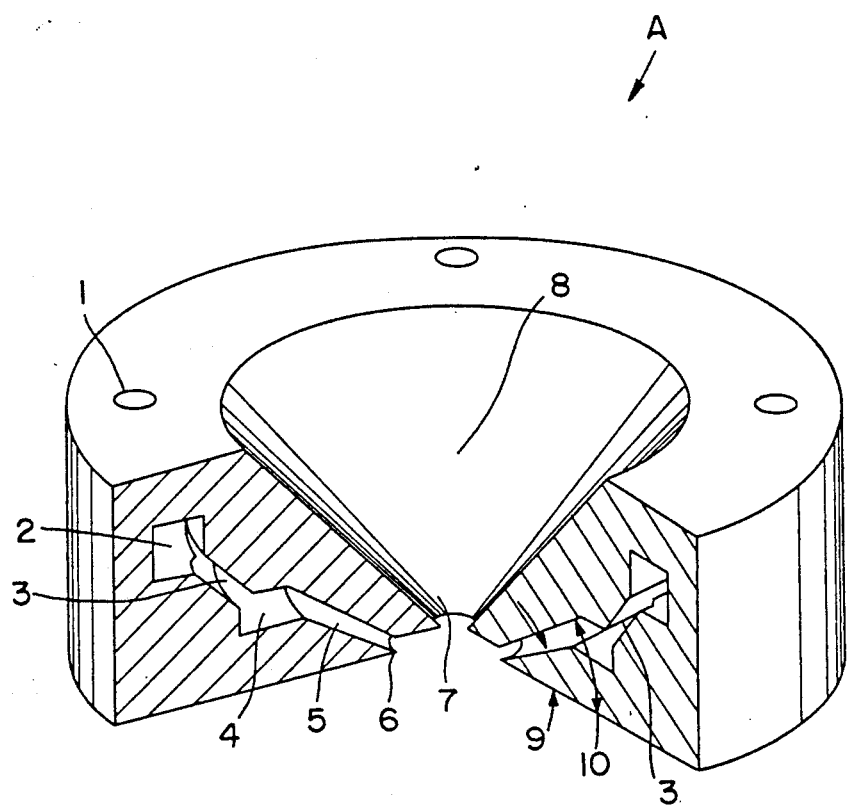
Fig. 1 represents a perspective partially sectioned view of the laser plume control device of the present invention.

Referring now to FIG. 1, there is seen a perspective view of a laser plume control device A, having four gas inlet locations 1, each respective gas inlet location 1 emptying into the first plenum 2, the first plenum 2 emptying into gas channel 3, which is spaced circumferentially around and within the wall of the device. The gas channel 3 directs the gas introduced through the gas inlet 1 to the second plenum 4. From the second plenum 4, the gas enters the continuous, circumferential outlet nozzle 5 which is designed so that the flow continually accelerates from the second plenum 4 to the nozzle exit 6 to terminate at the orifice 7. The central portion of the laser plume control device A defines an upside-down cone cavity 8, the vertex of which forms the orifice 7.

The outlet nozzle 5 is herein represented as having an angular relationship of about 25° for the angle 9 between the bottom surface of the device A and the bottom surface of the outlet nozzle 5, and about 30° for the angle 10 between the bottom surface of the device A and the top surface of outlet nozzle 5. The purpose of the difference in angle size is to achieve a decreasing area as the gas moves toward the center of the device. The decreasing area results in a continual radial flow acceleration from the second plenum 4 to the exit 6 of the nozzle 5. The depicted size of the respective angles 9 and 10 is not limitative of the invention.

The outlet nozzle 5 is designed so that no turbulence or separated flow regions are allowed to form. The outlet nozzle 5 generates radially directed laminar flow that is axisymmetric with respect to the weld pool. The orifice 7 is designed to change the flow direction out of the nozzle 5 from radial to axial and generate an axisymmetric jet in the opposite direction to the laser beam. The area of orifice 7 must be larger than the beam area, roughly twice the area of the beam.

Figure 2A:
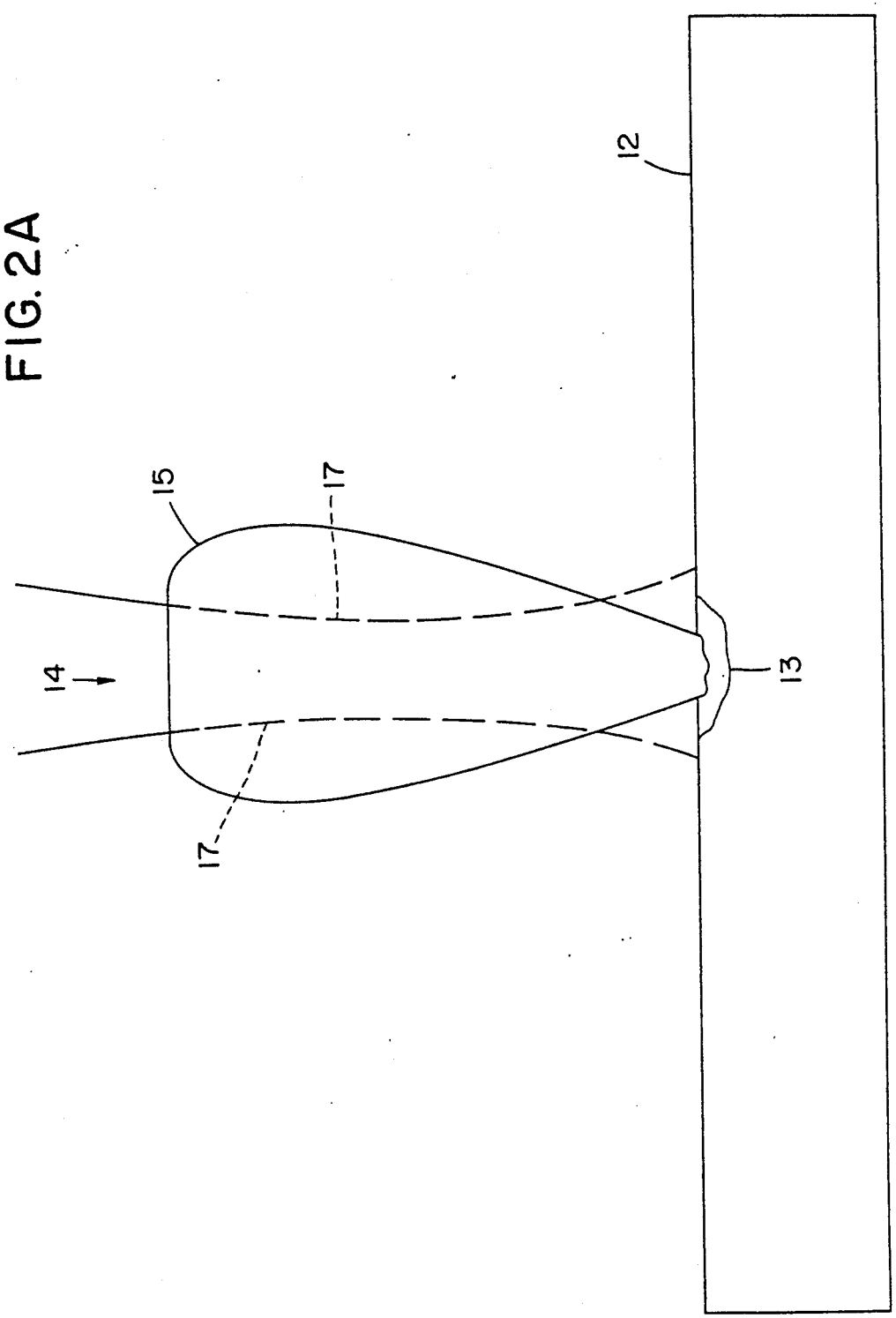
FIG. 2A is a diagrammatic sectional view of a laser plume without the control device of the present invention.

FIG. 2A represents a diagrammatic sectional view of the laser plume formed as a result of the laser beam welding process without the control device of the present invention. FIG. 2A illustrates a weld sample or weldment 12, fusion zone 13, laser beam 14 and plume 15, and spreading of the beam 14 at location 17 due to refraction as a result of thermal gradients and ionization within the plume.

FIG. 2B represents a diagrammatic sectional view of the decreased laser plume 15 using the control device A of the present invention. The laser plume control device A of FIG. 2B is shown with the gas inlet 1, first plenum 2, gas channel 3, second plenum 4, outlet nozzle 5, outlet nozzle exit 6, and orifice 7. A weld sample or weldment 12 is provided beneath the laser plume control device A. The fusion zone 13 is identified beneath the laser beam 14. As the small diffuse plume 15 is formed as a result of the welding taking place within the fusion zone, the external gas flow 16 introduced through the plume control device is axially symmetric with respect to the laser beam 14 and alters the plume 15. The outlet nozzle 5 directs the gas flow 16 radially inward on the surface of the weldment 12 in the fusion zone 13 at the base of the plume which is converted into an axisymmetric gas jet moving away from the weldment 12, as illustrated by the plume 15, carrying with it metal vapor, condensate and solidified particles.

The present invention has been demonstrated by laser welding of an aluminum alloy. The device of the present invention was used during laser welding trials with aluminum alloy 5456, which alloy contains, 5 wt. % magnesium. Pulsed Nd:YAG laser welds were made with the same welding parameters with and without the use of the plume control device. FIGS. 3–6 illustrate the results of these trials.

Figure 3:
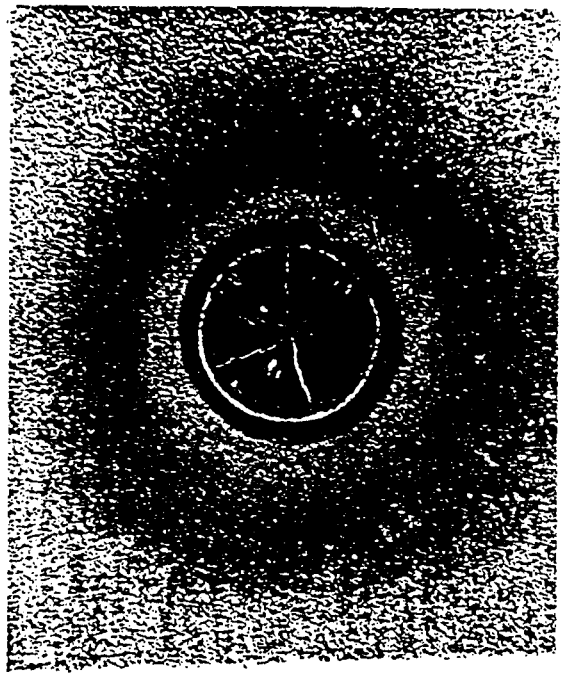
FIG. 3, is a photograph of a weld made without use of the plume control device of the present invention.
Figure 4:
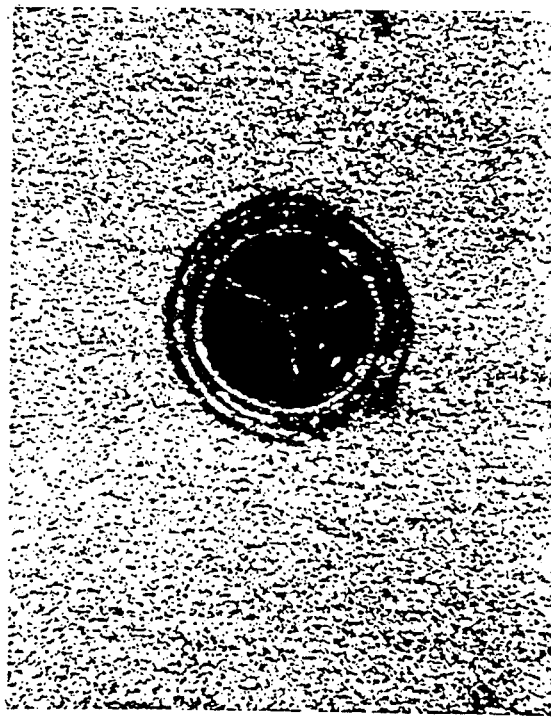
FIG. 4 is a photograph of a weld made with the use of the plume control device of the present invention.

FIG. 3 is a photograph of the top view of a weld made conventionally without the plume control device. As illustrated, a magnesium rich deposit from the plume is observed on the surface surrounding the fusion zone of the laser weld of the alloy, e.g. the dark ring deposited from the vapor plume seen surrounding the weld. FIG. 4 is another photograph of the top view of a weld, illustrating the different effect realized when the plume control device is used, e.g. the dark ring is no longer present.

Figure 5:
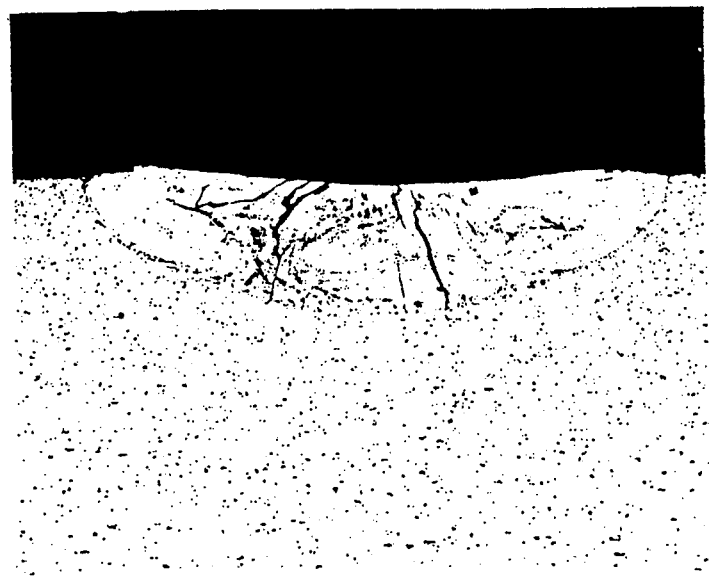
FIG. 5 is a metallographic section of a weld made with the use of the plume control device of the present invention.
Figure 6:
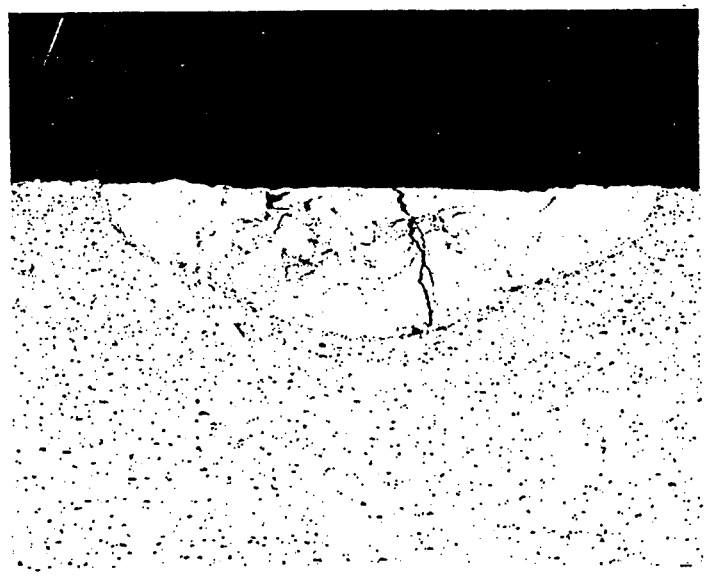
FIG. 6 is a metallographic section of a weld made utilizing an alternate embodiment of the plume control device of the present invention, at a higher flow rate of gas than in FIG. 5.

FIG. 5 shows a cross-section of a weld (magnified 50 times) of an aluminum alloy 5456 that was made with a 10 ft.$^3$/hr. argon flow at 14 joules, 5 ms pulse. FIG. 6 shows a cross-section of a weld (magnified 50 times) of an aluminum alloy 5456 made at 65 ft.$^3$/hr. argon flow at 14 joules, 5 ms pulse. As noted, the weld made at the higher flow rate exhibits a higher depth-to-width ratio. Higher depth-to-width ratios are generally considered more desirable during laser welding. Plume control studies have also been performed with other alloys including austenitic stainless steels, nickel, and molybdenum. Plume control is expected to be applicable to all classes of metal alloys, including but not limited to those based on iron, nickel, cobalt, aluminum, copper, titanium, zirconium, tantalum, niobium, and molybdenum.

Metallographic sections of welds made with the use of the plume control device indicate that weld geometry can be modified by varying the gas flow rate or gas type such as argon, as opposed to, for example, helium. Thus, for the welding parameters used in these particular tests, flow rates ranging from 10 to 65 ft.$^3$/hr. of argon were used. Flow rates in the range of from 15 to 30 ft.$^3$/hr. are preferred. While at the higher flow rates the plume was significantly reduced in size, in the case of the aluminum-magnesium alloy with the use of argon and laser welding of a stainless steel sample, the visible plume was entirely eliminated at an argon flow rate of 70 ft.$^3$/hr.

In principle, most gases should function in the plume control device. Commonly used gases during laser welding include argon, helium, and nitrogen. These gases are used because they do not oxidize the hot metals. Reducing gases such as nitrogen-hydrogen and argon-hydrogen mixtures have also been used. For some welds, oxidizing gases, including air, can be tolerated. In accordance with the present invention, the results of the welding trials demonstrated that the plume control device, as shown in FIGS. 1 and 2, is effective in greatly minimizing weld contamination during laser welding due to deposits from the laser plume. Thus, the application of a laser plume control device of the present invention controls both weld geometries and weld properties during laser welding.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims. For example, the device may be used on weldment geometries that would not allow close contact of the device to the weldment surface. Initial trials indicate that the device can still perform satisfactorily so long as axisymmetric gas flow is maintained.

What is claimed is:

1. A device for controlling a plume resulting during laser welding by a laser beam, comprising:
   (a) a cylindrical body, a central portion of which defines an upside-down cone cavity having a base and a vertex, said vertex forming an orifice of said body, said body having an upper peripheral rim surface circumscribing said base of said cone cavity,
   (b) at least one gas inlet spaced on said upper peripheral rim surface of said body, said inlet emptying into a first plenum which is a circumferential chamber around and within a wall of said body,
   (c) at least one channel which transfers the gas from said first plenum to a second plenum into which said each channel is directed, and
   (d) a tapered outlet nozzle leading from said second plenum to terminate at said orifice.

2. The device of claim 1, wherein four or more gas inlet locations, equally spaced on said upper peripheral rim surface of said body, are provided.

3. The device of claim 1, wherein the gas flow area of both plenums is greater than the total inlet flow area of said device.

4. The device of claim 1, wherein said outlet nozzle is so designed that gas flow from said second plenum continually accelerates in and to an exit for said outlet nozzle.

5. The device of claim 1, wherein a total flow area of said outlet nozzle exit is 20–50 times smaller than said plenum flow areas.

6. The device of claim 1, wherein the configuration of said nozzle generates radially directed laminar flow.

7. The device of claim 1, wherein said orifice converts radial flow into an axisymmetric gas jet perpendicular to a welding surface and opposite in direction to said laser beam.

8. The device of claim 1, wherein said orifice is concentric with said laser beam and resulting plume.

9. The device of claim 1, wherein orifice area is substantially equal to total nozzle exit area.

10. A method for controlling and regulating the plume formed during welding by a laser beam, comprising
(a) introducing a gas flow radially inward and downward onto the surface of a weldment;
(b) converting said radial flow of gas into an axisymmetric gas jet moving away from the surface of said weldment perpendicularly thereto, and in a direction opposite to said laser beam, carrying with it metal vapor, condensate and solidified particles, all resulting from said impinging laser beam,
wherein the velocity of said gas flow is regulated to minimize the resulting plume formed during welding and to eliminate particulate contamination.

* * * * *